(12) United States Patent
Teubel et al.

(10) Patent No.: US 10,180,142 B2
(45) Date of Patent: Jan. 15, 2019

(54) ELECTRIC MOTOR VEHICLE COOLANT PUMP

(75) Inventors: Jens Teubel, Hartha (DE); Ronald Rathke, Doebeln (DE); Martin Fiedlschuster, Mittweida (DE); Michael Weinert, Leisnig (DE); Norbert Weber, Essen (DE); Pietro Giannico, Essen (DE); Friedel Schlusnus, Essen (DE)

(73) Assignees: PIERBURG PUMP TECHNOLOGY GMBH, Neuss (DE); KOLEKTOR MAGNET TECHNOLOGY GMBH, Essen (DE)

( * ) Notice: Subject to any disclaimer, the term of this patent is extended or adjusted under 35 U.S.C. 154(b) by 921 days.

(21) Appl. No.: 13/641,702

(22) PCT Filed: Aug. 4, 2010

(86) PCT No.: PCT/EP2010/061362
§ 371 (c)(1),
(2), (4) Date: Oct. 17, 2012

(87) PCT Pub. No.: WO2011/131251
PCT Pub. Date: Oct. 27, 2011

(65) Prior Publication Data
US 2013/0039784 A1     Feb. 14, 2013

(30) Foreign Application Priority Data

Apr. 19, 2010  (DE) .......................... 10 2010 015 565

(51) Int. Cl.
*F04D 13/06*     (2006.01)
*F04D 29/02*     (2006.01)
(Continued)

(52) U.S. Cl.
CPC ....... *F04D 13/064* (2013.01); *F04D 13/0633* (2013.01); *F04D 29/026* (2013.01);
(Continued)

(58) Field of Classification Search
CPC . F04D 7/02; F04D 17/08; F04D 29/22; F04D 13/064; F04D 13/0633;
(Continued)

(56) References Cited

U.S. PATENT DOCUMENTS 2,982,466 A * 5/1961 Pier .......................... F04B 39/08
                                                    105/198.1
3,164,102 A * 1/1965 Schmidt .................. F04B 43/02
                                                    417/383

(Continued)

FOREIGN PATENT DOCUMENTS

DE        4411960 A1 * 10/1995 ......... F04D 13/0673
DE        101 33 936 A1    1/2003
(Continued)

OTHER PUBLICATIONS

WO 2008000221 A1, translation from Proquest.*
(Continued)

*Primary Examiner* — Patrick Hamo
*Assistant Examiner* — Joseph Herrmann
(74) *Attorney, Agent, or Firm* — Norman B. Thot

(57) ABSTRACT

An electric motor vehicle coolant pump for cooling an internal combustion engine of a motor vehicle includes a pump housing and a rotor rotatably supported in the pump housing. The rotor comprises a motor rotor configured to be substantially pot-shaped. The motor rotor comprises a pot bottom and a ferromagnetic substance so as to be magnetized in at least a bipolar manner. A pump rotor comprises a plurality of rotor blades and an annular cover ring arranged on distal ends of the plurality of rotor blades. The plurality (Continued)

of rotor blades are configured to stand directly on the pot bottom of the motor rotor. The pump rotor and the motor rotor are each integral plastic material parts separately produced by an injection molding. The pump rotor and the motor rotor are made from different materials. The pump rotor is not ferromagnetic.

14 Claims, 4 Drawing Sheets

(51) Int. Cl.
    *F04D 29/22*     (2006.01)
    *F04D 29/62*     (2006.01)
    *H02K 1/27*     (2006.01)
    *H02K 5/128*     (2006.01)

(52) U.S. Cl.
    CPC ....... F04D 29/2222 (2013.01); F04D 29/628 (2013.01); *F05D 2230/20* (2013.01); *F05D 2230/232* (2013.01); *F05D 2300/43* (2013.01); *F05D 2300/603* (2013.01); *H02K 1/2786* (2013.01); *H02K 5/128* (2013.01)

(58) Field of Classification Search
    CPC .. F04D 29/026; F04D 29/628; F04D 29/2222; F04D 29/2227; F04D 29/2216; H02K 5/225; H02K 1/187; H02K 1/278; H02K 1/2726; H02K 1/148; H02K 1/185; H02K 3/522; H02K 21/16
    USPC ................ 310/43, 156, 216; 417/357, 423.1, 417/423.11, 423.7, 423.15, 423.14, 410.1, 417/DIG. 1, 360
    See application file for complete search history.

(56) References Cited

U.S. PATENT DOCUMENTS

| | | | | |
|---|---|---|---|---|
| 4,329,606 | A * | 5/1982 | Montagu | H02K 9/22 310/112 |
| 4,508,567 | A * | 4/1985 | Mizuno | B22F 1/00 29/596 |
| 4,549,157 | A * | 10/1985 | Loubier | B29C 45/0013 252/62.54 |
| 4,678,616 | A * | 7/1987 | Kawashima | H01F 13/003 264/108 |
| 5,229,738 | A * | 7/1993 | Knapen | H01F 41/028 310/156.43 |
| 5,328,523 | A * | 7/1994 | Fontaine | H01F 10/13 148/108 |
| 5,433,118 | A * | 7/1995 | Castillo | G01F 1/115 335/303 |
| 5,477,092 | A * | 12/1995 | Tarrant | H02K 1/22 29/598 |
| 5,488,260 | A * | 1/1996 | Heyraud | H02K 1/278 29/598 |
| 5,500,994 | A * | 3/1996 | Itaya | H02K 1/2733 264/272.2 |
| 6,133,664 | A * | 10/2000 | Torok | H02K 29/03 310/181 |
| 6,154,352 | A * | 11/2000 | Atallah | H02K 15/03 361/143 |
| 6,483,218 | B1 * | 11/2002 | Petrinko | H01F 38/18 310/112 |
| 6,663,362 | B1 | 12/2003 | Lentz et al. | |
| 7,157,827 | B2 * | 1/2007 | Heideman et al. | 310/216.001 |
| 7,500,829 | B2 * | 3/2009 | Edwards | F04D 29/026 416/170 R |
| 7,594,352 | B2 * | 9/2009 | Holmberg | F16M 11/04 248/309.1 |
| 7,703,717 | B2 * | 4/2010 | Soderberg | B64C 25/36 188/161 |
| 8,162,630 | B2 * | 4/2012 | Platt | F04D 29/048 417/420 |
| 8,350,440 | B2 * | 1/2013 | Thangirala | H02K 1/12 310/216.106 |
| 2001/0036416 | A1 * | 11/2001 | Obara | F04D 25/08 417/423.1 |
| 2002/0083791 | A1 * | 7/2002 | Detore | B29C 53/8041 74/572.12 |
| 2002/0166520 | A1 * | 11/2002 | Heim | F04D 13/0666 123/41.44 |
| 2002/0179185 | A1 * | 12/2002 | Billiet | H01F 1/0558 148/105 |
| 2003/0057780 | A1 * | 3/2003 | Corey | H02K 1/34 310/15 |
| 2003/0084888 | A1 * | 5/2003 | LeBold | F04D 25/024 123/599 |
| 2004/0056538 | A1 * | 3/2004 | Du | H01R 43/10 310/43 |
| 2004/0062664 | A1 * | 4/2004 | Weigold | F04D 29/5813 417/357 |
| 2005/0281498 | A1 | 12/2005 | Hayashi et al. | |
| 2006/0051217 | A1 * | 3/2006 | Felton | F04C 5/00 417/410.1 |
| 2006/0057002 | A1 * | 3/2006 | Nakanishi | H05K 3/284 417/423.7 |
| 2006/0087186 | A1 * | 4/2006 | Wasson | H02K 1/14 310/114 |
| 2006/0273677 | A1 * | 12/2006 | Horng | F04D 25/08 310/156.38 |
| 2007/0001528 | A1 * | 1/2007 | Umegaki et al. | 310/88 |
| 2007/0090704 | A1 * | 4/2007 | Chen | 310/86 |
| 2008/0044680 | A1 * | 2/2008 | Thibodeau | B29C 45/0013 428/547 |
| 2008/0138193 | A1 * | 6/2008 | Tsai | F04D 29/2205 415/119 |
| 2009/0050082 | A1 * | 2/2009 | Iwasaki | F04D 13/06 123/41.49 |
| 2014/0117803 | A1 * | 5/2014 | Tarrant | B29B 15/122 310/156.01 |

FOREIGN PATENT DOCUMENTS

| | | | |
|---|---|---|---|
| DE | 10 2008 008290 A1 | 8/2009 | |
| EP | 1 158 175 A2 | 11/2001 | |
| EP | 1340917 A1 * | 9/2003 | ........... F04D 29/426 |
| FR | 2 892 472 A3 | 4/2007 | |
| JP | 2003-515059 A | 4/2003 | |
| JP | 2006-9819 A | 1/2006 | |
| JP | 2007-205246 A | 8/2007 | |
| JP | 2010-38082 A | 2/2010 | |
| JP | 2010-65528 A | 3/2010 | |
| WO | WO 2008000221 A1 * | 1/2008 | |

OTHER PUBLICATIONS

13641702—DE4411960A1—Translation from Proquest.*
Non-Patent Literature, Globalspec, About Impellers, Wayback machine, http://globalspec/learnmore/flow_control_flow_transfer/pumps/impellers, Jan. 22, 2005, accessed Dec. 1, 2015.*
Translation of the DE102008008290 (A1) from the IDS.*

* cited by examiner

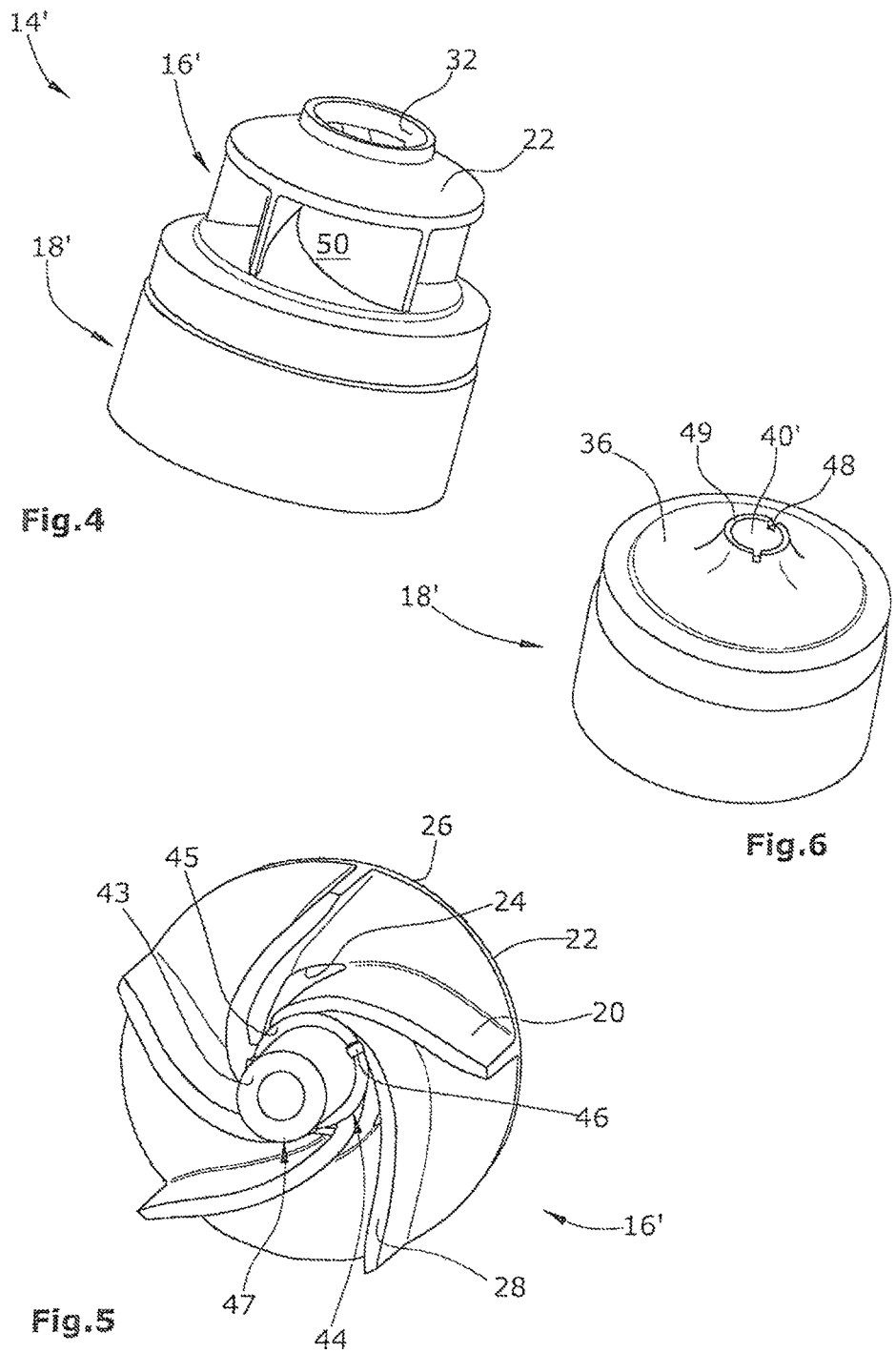

ELECTRIC MOTOR VEHICLE COOLANT PUMP

CROSS REFERENCE TO PRIOR APPLICATIONS

This application is a U.S. National Phase application under 35 U.S.C. § 371 of International Application No. PCT/EP2010/061362, filed on Aug. 4, 2010 and which claims benefit to German Patent Application No. 10 2010 015 565.9, filed on Apr. 19, 2010. The International Application was published in German on October 27, 2011 as WO 2011/131251 A1 under PCT Article 21(2).

FIELD

The present invention relates to an electrically driven motor vehicle coolant pump for a motor vehicle driven by an internal combustion engine, the pump comprising a pump housing and a rotor rotatably supported in the pump housing. The rotor is formed by a pump rotor and a substantially pot-shaped motor rotor, the pump rotor having a plurality of rotor blades standing immediately on the pot bottom of the motor rotor.

BACKGROUND

Electric motor vehicle coolant pumps are used, for example, in supercharged air cooling and engine cooling so as to realize a cooling corresponding to respective requirements, in particular, in the cold start phase. This results in reduced fuel consumption and in a corresponding reduction of exhaust gas emissions.

Such a coolant pump is described, for example, in DE 101 33 936 A1. The coolant pump described therein comprises an integrally-formed and rotatably-supported rotor made from an injection molded plastic material. The rotor comprises a pump rotor section with a plurality of arcuate rotor blades projecting radially from a pump rotor bottom. The rotor further comprises a motor rotor section which is a part of an electric drive motor. The entire rotor is made from a polyamide or polyphenylene sulphide plastic material and a finely dispersed admixture of permanent magnet. Such a plastic material/permanent magnet material mixture has a reduced mechanical stability relative to a pure plastic material so that with such a rotor structure, the material thickness of the rotor blades must be chosen to be correspondingly thick in order to endure the mechanical stresses and to guarantee a safe operation. As a consequence, the available flow cross section of the pump rotor channels between the rotor blades is rather small, whereby the efficiency of the rotor is compromised. For reasons of process engineering, an integrally-formed rotor can moreover be produced by injection-molding only with axially distally open pump rotor channels. A pump rotor with distally open pump rotor channels has a reduced hydraulic performance, so that the efficiency of the rotor is also thereby reduced.

SUMMARY

An aspect of the present invention is to provide an electric motor vehicle coolant pump with improved efficiency.

In an embodiment, the present invention provides an electric motor vehicle coolant pump for cooling an internal combustion engine of a motor vehicle which includes a pump housing and a rotor rotatably supported in the pump housing. The rotor comprises a motor rotor configured to be substantially pot-shaped. The motor rotor comprises a pot bottom and a ferromagnetic substance so as to be magnetized in at least a bipolar manner. A pump rotor comprises a plurality of rotor blades and an annular cover ring arranged on distal ends of the plurality of rotor blades. The plurality of rotor blades are configured to stand directly on the pot bottom of the motor rotor. The pump rotor and the motor rotor are each integral plastic material parts separately produced by an injection molding. The pump rotor and the motor rotor are made from different materials. The pump rotor is not ferromagnetic.

BRIEF DESCRIPTION OF THE DRAWINGS

The present invention is described in greater detail below on the basis of embodiments and of the drawings in which:

FIG. 4 shows a perspective view of an embodiment of the coolant pump rotor;

FIG. 5 shows a perspective view of the pump rotor in FIG. 4;

FIG. 6 shows a perspective view of the motor rotor in FIG. 4;

DETAILED DESCRIPTION

Figure 1:
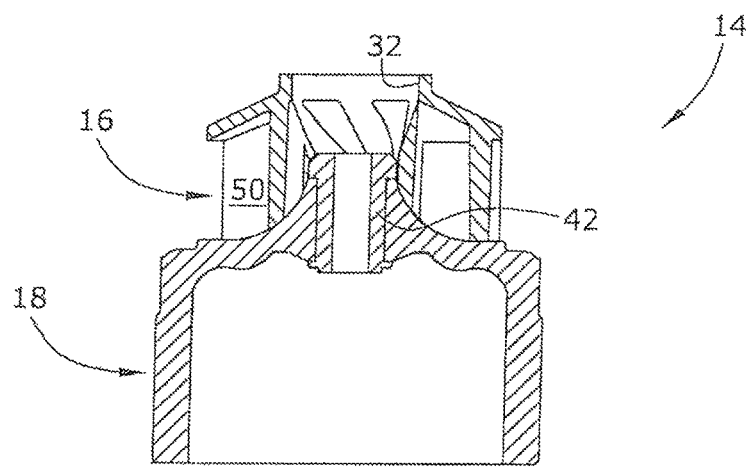
FIG. 1 shows a section through the rotor of the coolant pump according to the present invention.

The pump rotor and the motor rotor of the coolant pump are each integrally formed injection-molded plastic material components, which are made from different materials. This means that the pump rotor is, for example, made from a mechanically robust plastic material or plastic material mixture and the motor rotor is made from a different plastic material or a plastic material/metal mixture, which is adapted to technical requirements. The motor rotor comprises a homogenously-dispersed ferromagnetic substance and is magnetized at least in a bipolar manner and thereby forms a permanently excited electric motor rotor. The pump rotor comprises an annular cover ring and contains no ferromagnetic substance, i.e. it is not ferromagnetic.

Since the pump rotor is produced separately, a plastic material adapted to the technical demands can be selected, for example, a plastic material with a high mechanical stability. The pump rotor further contains no ferromagnetic substance that would weaken the mechanical stability. The material thickness of the rotor blades can thus be chosen to be correspondingly thin so that maximum flow cross sections of the individual pump rotor channels are formed. This results in an improved efficiency of the pump rotor. The pump rotor is further equipped with an annular cover ring on the distal ends of the rotor blades. The pump rotor channels are thereby axially distally closed, whereby the hydraulic efficiency is substantially improved over that of distally open pump rotor channels.

In an embodiment of the present invention, the motor rotor can, for example, have a cylindrical opening on the axial line which serves as a bearing bush for an axis or as a receptacle for a separate bearing bush.

In an embodiment of the present invention, the motor rotor can, for example, comprise a separate cylindrical bearing bush in the cylindrical opening. It is thus possible to produce the motor rotor in an economic manner without complicated and costly insertion processes, wherein a bearing bush is positioned in the injection mold before the injection molding process.

In an embodiment of the present invention, the motor rotor can, for example, have one or a plurality of axial depressions in the pot bottom for receiving the axial proximal rotor blade ends. As an alternative or in addition thereto, the rotor blades have axial bearing pins sitting in corresponding axial openings in the pot bottom of the motor rotor. This allows for a form-fitting connection of the pump rotor with the motor rotor.

In an embodiment of the present invention, the pump rotor can, for example, have a cylindrical bearing bush formed integrally with the pump rotor. The pump rotor can thus be produced in an economic manner without complicated and costly insertion processes, wherein a bearing bush is positioned in the injection mold before the injection molding process.

In an embodiment of the present invention, the hub of the motor rotor can, for example, comprise at least one axial tappet recess cooperating with a corresponding axial tappet pin of the pump rotor hub. This allows for a hub-side form-fitting connection of the pump rotor and the motor rotor with each other.

In an embodiment of the present invention, the pump rotor and the motor rotor can, for example, be materially bonded to each other by a welding connection. The welding may be made by laser welding, ultrasonic welding or other welding methods known to a skilled person. It is also possible to use other joining techniques known to the skilled person, such as hot caulking, for example, in order to realize a material bond between the pump rotor and the motor rotor.

In an embodiment of the present invention, the pump rotor and the motor rotor can, for example, be connected by a latch connection. A latch connection allows for a simple and low-cost form-fitting connection of the pump rotor and the motor rotor.

In an embodiment of the present invention, the pump rotor can, for example, be made from a carbon-fiber reinforced composite material containing, for example, TEFLON® (polytetrafluoroethylene) or graphite. Composite materials are superior in mechanical stability over pure plastic materials or plastic material mixtures so that the material thickness of the rotor blades can be chosen to be correspondingly thin in the interest of realizing a maximum flow cross section of the pump rotor channels.

In an embodiment of the present invention, the pot bottom can, for example, be substantially funnel-shaped, with the funnel tapering toward the inlet. The outer surface of the pot bottom is thereby formed so that the pump rotor channels extend in a fluidically favorable manner so that the coolant is always deflected from an axial direction to a radial direction.

Figure 7:
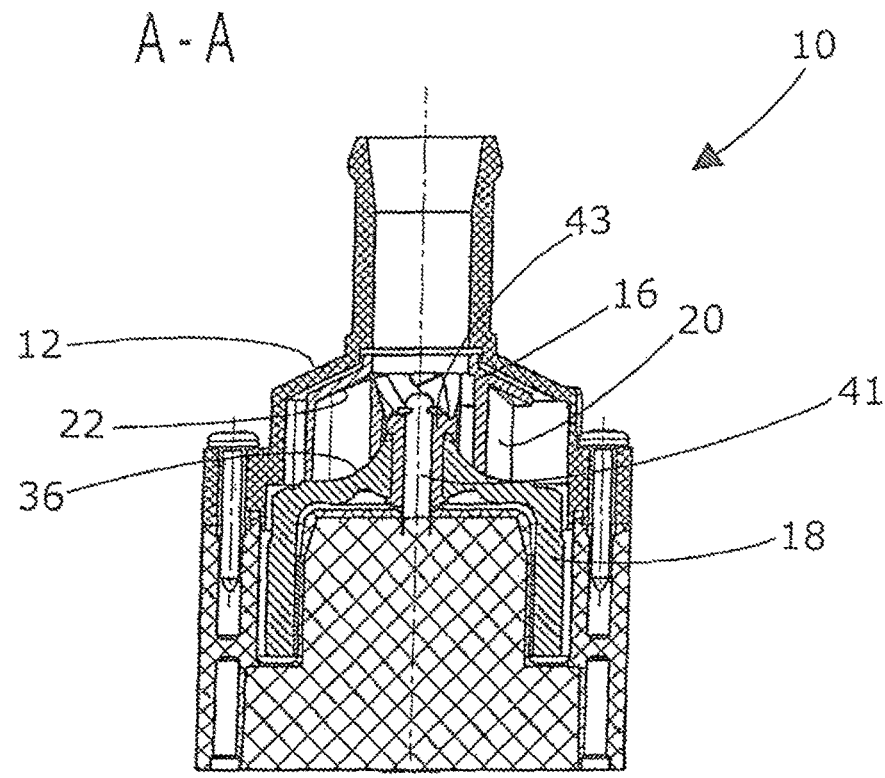
FIG. 7 shows a section through the coolant pump with the rotor shown in FIG. 1.
Figure 8:
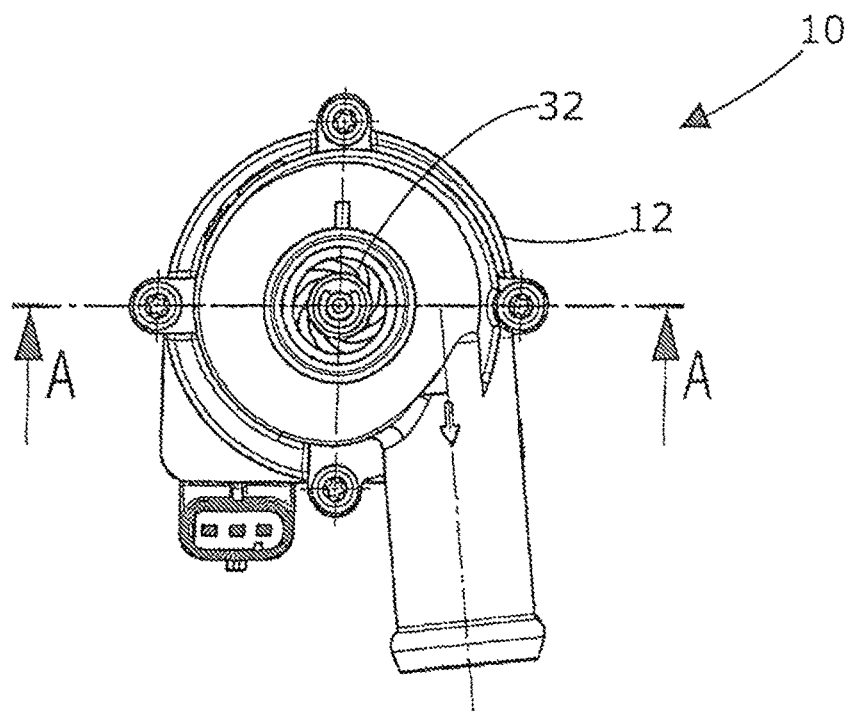
FIG. 8 shows a top plan view on the coolant pump of the present invention shown in FIG. 7.

FIG. 7 shows an electric motor vehicle coolant pump 10 for cooling an internal combustion engine of a motor vehicle. The coolant pump 10 comprises a pump housing 12 and a rotor 14 rotatably supported in the pump housing 12, the rotor 14 being formed by a pump rotor 16 and a substantially pot-shaped motor rotor 18.

Figures 2, 3:
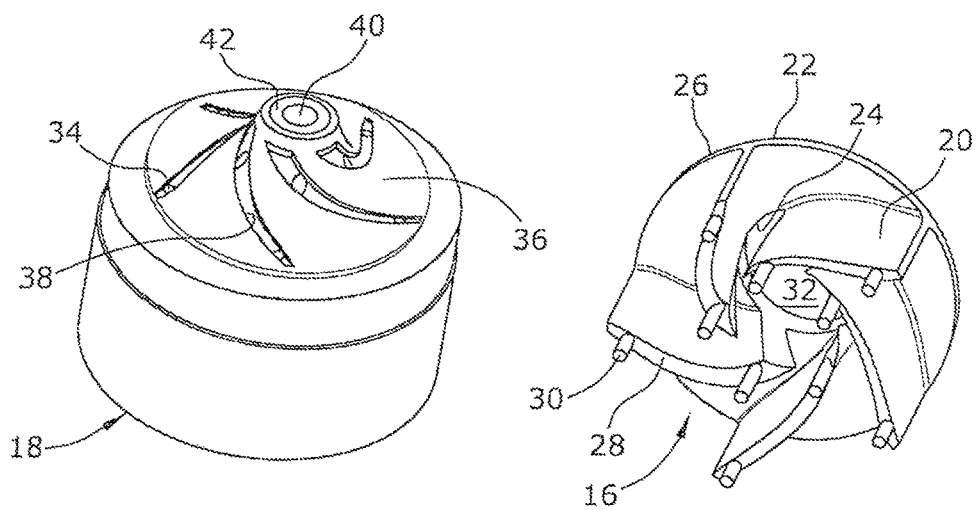
FIG. 2 shows a perspective view of the motor rotor of the coolant pump according to the present invention.
FIG. 3 shows a perspective view of the pump rotor of the coolant pump according to the present invention.

The pump rotor 16 of FIG. 3 is formed by a plurality of substantially arcuate rotor blades 20 and an annular cover ring 22 formed on the distal ends of the rotor blades 20, the rotor blades 20 extending radially from an inner circumference line 24 of the cover ring 22 towards an outer circumference line 26 of the cover ring 22. The pump rotor 16, which is formed integrally, is made from a pure plastic material or from a carbon-fiber reinforced composite material which, for example, contains TEFLON® (polytetrafluoroethylene) or graphite. The rotor blades 20 have at least one axial bearing pin 30 at their axial proximal rotor blade ends 28. The pump rotor 16 has an axial inlet opening 32, so that the coolant is conveyed radially outward from the axial inlet opening 32 of the pump rotor 16. The axial bearing pins 30 of the rotor blades 20 cooperate with corresponding axial openings 34 in the pot bottom 36 of the motor rotor 18 illustrated in FIG. 2.

The pot bottom 36 of the motor rotor 18 is substantially funnel-shaped, the funnel tapering towards the inlet opening 32.

The motor rotor 18 is an integral plastic material part made by injection-molding, which contains a ferromagnetic substance and is magnetized at least in a bipolar manner in the circumferential direction. On the outer side of the pot bottom 36, facing the pump rotor 16, the motor rotor 18 is provided with axial depressions 38 cooperating with the axial proximal rotor blade ends 28. By means of the axial depressions 38 and the axial openings 34 in the motor rotor 18 and the axial bearing pins 30 of the pump rotor 16, a form-fitting connection of the pump rotor 16 and the motor rotor 18 is provided. In the pot bottom 36, the motor rotor 18 has a cylindrical opening 40 on the axial line, serving as a bearing bush 42 for receiving an axis 41. As an alternative, it is also possible to install a separate bearing bush 42 in the opening 40.

Figure 9:
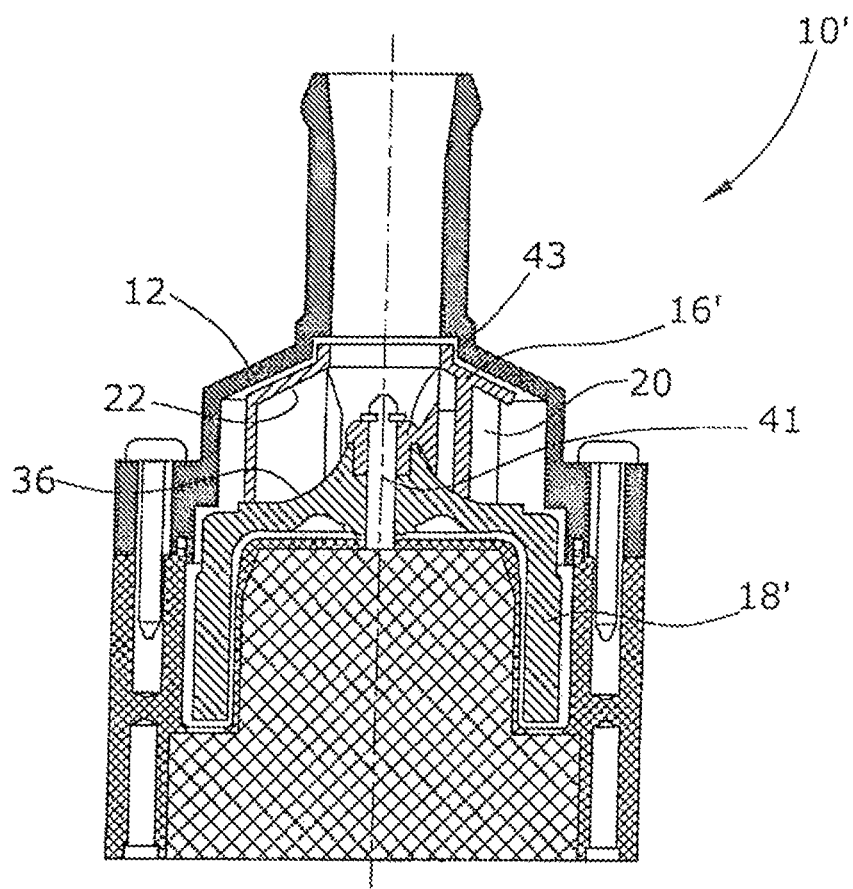
FIG. 9 shows a section through the coolant pump having the rotor shown in FIG. 4.

In a further embodiment of the rotor 14' of the coolant pump 10', illustrated in FIG. 9, the pump rotor 16' comprises a centrally-positioned axial bearing bush 43 for receiving the axis 41, the bearing bush 43 being formed integrally with the pump rotor 16'. The pump rotor 16' further comprises a hub 47, the hub 47 comprising a bearing ring 44 surrounding the bearing bush 43 and having a bearing surface 45, the ring being provided with at least one axial tappet pin 46.

In correspondence to the tappet pin 46 of the pump rotor 16', the hub 49 of the motor rotor 18' of the coolant pump 10' comprises an axial tappet recess 48.

Both plastic material parts of the rotor 14, 14', namely the pump rotor 16, 16' and the motor rotor 18, 18' are separately injection-molded as integral parts. The pump rotor 16, 16' is, for example, made from carbon fiber reinforced polyphenylene sulphide (PPS) and another component, such as TEFLON® (polytetrafluoroethylene) or graphite, and therefore has good sliding properties. The material mixture further has a high mechanical stability so that the material thickness of the rotor blades 20 can be selected to be rather thin, whereby the efficiency of the pump rotor 16, 16' is high. The motor rotor 18, 18' is advantageously injection-molded from polyphe-nylene sulphide and a magnetic substance, e.g. hard ferrite in the form of dust. The motor rotor 18, 18' is magnetized at least in a bipolar manner. Both parts, namely the pump rotor 16, 16' and the motor rotor 18, 18', are joined by means of a welding connection or, alternatively, by means of a latch connection.

The present invention is not limited to embodiments described herein; reference should be had to the appended claims.

What is claimed is:

1. An electric motor vehicle coolant pump for cooling an internal combustion engine of a motor vehicle, the electric motor vehicle coolant pump comprising:
- a pump housing; and
- a rotor rotatably supported in the pump housing, the rotor comprising:
    - a motor rotor configured to be substantially pot-shaped, the motor rotor comprising a pot bottom and a ferromagnetic substance so as to be magnetized in at least a bipolar manner, the ferromagnetic substance being homogenously dispersed throughout the motor rotor, and
    - a pump rotor comprising a plurality of rotor blades and an annular cover ring arranged on distal ends of the plurality of rotor blades, the plurality of rotor blades being configured to stand directly on the pot bottom of the motor rotor, wherein,
the pump rotor and the motor rotor are each integral plastic material parts separately produced by an injection molding,
the pump rotor and the motor rotor are made from different materials, and
the pump rotor is not ferromagnetic.

2. The electric motor vehicle coolant pump as recited in claim 1, wherein the motor rotor further comprises a cylindrical opening on an axial line.

3. The electric motor vehicle coolant pump as recited in claim 2, wherein the motor rotor further comprises a separate cylindrical bearing bush in the cylindrical opening.

4. The electric motor vehicle coolant pump as recited in claim 1, wherein each of the plurality of rotor blades has an axial proximal rotor blade end, and wherein the motor rotor further comprises axial depressions in the pot bottom, the axial depressions being configured to receive the axial proximal rotor blade ends.

5. The electric motor vehicle coolant pump as recited in claim 1, wherein the pot bottom of the motor rotor comprises axial receiving openings, and wherein the plurality of rotor blades further comprise axial bearing pins configured to sit in the axial receiving openings.

6. The electric motor vehicle coolant pump as recited in claim 1, wherein the pump rotor further comprises a cylindrical bearing bush formed integrally with the pump rotor.

7. The electric motor vehicle coolant pump as recited in claim 1, wherein the motor rotor further comprises a hub with at least one axial tappet recess, the pump rotor further comprises a hub with an axial tappet pin, and wherein the at least one axial tappet recess is configured to cooperate with the axial tappet pin.

8. The electric motor vehicle coolant pump as recited in claim 1, wherein the pump rotor and the motor rotor are joined by a welding connection.

9. The electric motor vehicle coolant pump as recited in claim 1, wherein the pump rotor and the motor rotor are joined by a latch connection.

10. The electric motor vehicle coolant pump as recited in claim 1, wherein the pump rotor is made from a carbon fiber reinforced composite material.

11. The electric motor vehicle coolant pump as recited in claim 10, wherein the carbon fiber reinforced composite material comprises polytetrafluoroethylene or a graphite.

12. The electric motor vehicle coolant pump as recited in claim 1, wherein the pot bottom is substantially funnel-shaped.

13. An electric motor vehicle coolant pump for cooling an internal combustion engine of a motor vehicle, the electric motor vehicle coolant pump comprising:
- a pump housing; and
- a rotor rotatably supported in the pump housing, the rotor consisting of:
    - a motor rotor configured to be substantially pot-shaped, the motor rotor comprising a pot bottom, the motor rotor being an integral plastic material part made of a material consisting of plastic and a ferromagnetic substance so as to be magnetized in at least a bipolar manner, the ferromagnetic substance being homogenously dispersed throughout the motor rotor, and
    - a pump rotor comprising a plurality of rotor blades and an annular cover ring arranged on distal ends of the plurality of rotor blades, the plurality of rotor blades being configured to stand directly on the pot bottom of the motor rotor, the pump rotor being an integral plastic material part, wherein,
the pump rotor and the motor rotor are each separately produced by an injection molding,
the pump rotor and the motor rotor are made from different materials, and
the pump rotor is not ferromagnetic.

14. An electric motor vehicle coolant pump for cooling an internal combustion engine of a motor vehicle, the electric motor vehicle coolant pump comprising:
- a pump housing; and
- a rotor rotatably supported in the pump housing, the rotor comprising:
    - a motor rotor configured to be substantially pot-shaped, the motor rotor comprising a pot bottom and a ferromagnetic substance so as to be magnetized in at least a bipolar manner, the ferromagnetic substance being homogenously dispersed throughout the motor rotor, and
    - a pump rotor comprising a plurality of rotor blades and an annular cover ring arranged on distal ends of the plurality of rotor blades, the plurality of rotor blades being configured to stand directly on the pot bottom of the motor rotor, wherein,
the pump rotor and the motor rotor are each integral plastic material parts separately produced by an injection molding,
the pump rotor and the motor rotor are made from different materials,
the pump rotor is not ferromagnetic,
each of the plurality of rotor blades has an axial proximal rotor blade end, and
the motor rotor further comprises axial depressions in the pot bottom, the axial depressions being configured to receive the axial proximal rotor blade ends.

* * * * *